(12) United States Patent
Pattillo et al.

(10) Patent No.: US 8,618,006 B2
(45) Date of Patent: Dec. 31, 2013

(54) CEMENT-FREE REFRACTORY

(75) Inventors: Robert A. Pattillo, Birmingham, AL (US); Samuel B. Bonsall, Bowling Green, OH (US)

(73) Assignee: Vesuvius Crucible Company, Wilmington, DE (US)

( * ) Notice: Subject to any disclaimer, the term of this patent is extended or adjusted under 35 U.S.C. 154(b) by 29 days.

(21) Appl. No.: 13/362,665

(22) Filed: Jan. 31, 2012

(65) Prior Publication Data

US 2012/0142518 A1 Jun. 7, 2012

Related U.S. Application Data

(63) Continuation-in-part of application No. 12/307,627, filed as application No. PCT/US2007/072927 on Jul. 6, 2007, now abandoned.

(60) Provisional application No. 60/818,799, filed on Jul. 6, 2006.

(51) Int. Cl.
  *C04B 35/103* (2006.01)
  *C04B 35/567* (2006.01)

(52) U.S. Cl.
  USPC ............... 501/89; 501/90; 501/100; 501/128

(58) Field of Classification Search
  USPC ...................... 501/89, 90, 128, 100
  See application file for complete search history.

(56) References Cited

U.S. PATENT DOCUMENTS

| 4,393,143 | A | 7/1983 | Yoshinaka et al. |
| 4,424,281 | A | 1/1984 | Jones |
| 4,921,536 | A | 5/1990 | Rechter |
| 5,250,479 | A | 10/1993 | Rancoule et al. |
| 5,366,944 | A | 11/1994 | Rumpeltin et al. |
| 5,422,323 | A | 6/1995 | Banerjee et al. |
| 5,512,523 | A | 4/1996 | Ono et al. |
| 5,783,510 | A | 7/1998 | Kida et al. |
| 6,117,373 | A | 9/2000 | Kida et al. |
| 6,284,688 | B1 | 9/2001 | Trinkl et al. |
| 6,395,662 | B1 | 5/2002 | Li et al. |
| 6,846,763 | B2 | 1/2005 | Jansen et al. |
| 2006/0266714 | A1 | 11/2006 | Olson et al. |
| 2008/0314084 | A1 | 12/2008 | Connors et al. |

FOREIGN PATENT DOCUMENTS

| CN | 1104191 | | 6/1995 |
| EP | 0364640 | A1 | 4/1990 |
| EP | 0064863 | A1 | 12/2008 |
| EP | 2565173 | * | 3/2013 |
| FR | 2914300 | | 10/2008 |
| JP | 57-003772 | | 1/1982 |
| JP | 59121147 | | 7/1984 |
| JP | 59-190276 | | 10/1984 |
| JP | 63117975 | | 5/1988 |
| JP | H07215773 | A | 8/1995 |
| JP | 08157266 | | 6/1996 |
| JP | 10291867 | | 11/1998 |
| JP | H11228241 | A | 8/1999 |
| JP | 2004203702 | A | 7/2004 |
| JP | 2005047757 | A | 2/2005 |
| WO | 9217419 | | 10/1992 |
| WO | 99/08804 | A1 | 12/2008 |

* cited by examiner

*Primary Examiner* — Karl Group
(74) *Attorney, Agent, or Firm* — Thomas Clinton; Donald M. Satina

(57) ABSTRACT

A cement free refractory mixture contains aluminum oxide, silicon carbide, fumed silica, aluminum metal, an anti-oxidant, reactive alumina, and a carbon-bearing material. The mixture can be formed by conventional techniques to create refractory articles to contain or direct the flow of liquid metals. Refractory articles formed by the mixture do not require firing to achieve an initial cure.

19 Claims, No Drawings

CEMENT-FREE REFRACTORY

CROSS-REFERENCES TO RELATED APPLICATIONS

This application is a continuation-in-part of application Ser. No. 12/307,627, filed Jan. 6, 2009, now abandoned, which application claims priority from International Application PCT/US07/72927, filed Jul. 6, 2007, which application claims priority from provisional application Ser. No. 60/818,799, filed Jul. 6, 2006.

FIELD OF THE INVENTION

The invention relates to a refractory mixture. The mixture contains a pH buffer and fumed silica or silicon metal. The mixture can be formed by conventional techniques to create a refractory article. The article can have superior physical properties, including greater refractoriness, than materials having cement-based or chemical binders.

BACKGROUND OF THE INVENTION

Refractory articles include both pre-formed products and products that are shaped in situ. Pre-formed products include shrouds, tubes, plates, and bricks. Formed products may be used as linings for vessels, tubes or channels, and are often provided as a mixture that may be rammed, gunned, trowelled, sprayed, vibrated or cast in place.

Refractory articles must resist thermal, chemical and mechanical attacks. Thermal attacks include high temperature, often above 1000 C, and thermal shock caused by quickly changing the temperature of the article. Frequently, the application in which the article is used includes or generates damaging chemicals. For example, slag present in steel casting chemically attacks the refractory articles so that articles in contact with slag often include slag-resistant oxides, such as zirconia. Similarly, refractory tubes used in aluminum-killed steels must resist a build-up of alumina that could otherwise clog the tube. Finally, the refractory article must be strong enough to resist mechanical forces, such as compressive, tensile and torsional stresses.

Commonly, refractory articles are formed from a combination of refractory aggregate and a binder. The binder holds the aggregate in place. Both the aggregate and binder can profoundly affect the properties of the article. Common aggregates include silica, zirconia, silicon carbide, alumina, magnesia, spinels, calcined dolomite, chrome magnesite, olivine, forsterite, mullite, kyanite, andalusite, chamotte, carbon, chromite, and their combinations.

Binders have fallen into two broad classes, cementitious and "chemical." Chemical binders include organic and inorganic chemicals, such as phenols, furfural, organic resins, phosphates and silicates. The article must often be fired to activate the chemical and initiate the binder. Cementitious binders include cement or other hydratable ceramic powders, such as calcium aluminate cement or hydratable alumina. They usually do not require heating to activate the binder but do require the addition of water. Water reacts with the cementitious binder to harden the mixture. Water also serves as a dispersing medium for the fine powders. Dry powders have poor flowability and are not suitable for forming refractory articles in the absence of high pressure. Water reduces the viscosity of the mixture, thereby permitting the aggregate/binder mixture to flow. Unfortunately, the presence of water in a refractory article can have disastrous effects, namely cracking of the article when exposed to elevated temperatures and even explosive vaporization at refractory temperatures. An article having a cementitious binder often requires a drying step to eliminate residual water.

A refractory aggregate/binder mixture typically includes at least 70 wt. % aggregate and up to about 15 wt. % cement binder. Water is added to make up the balance of the mixture in a quantity sufficient to produce the desired flow for forming a refractory article. Water can be added directly or as a hydrate. For example, European Patent Application Publication No. 0064863 adds water as an inorganic hydrate that decomposes at elevated temperatures. U.S. Pat. No. 6,284,688 includes water in micro-encapsulated sodium silicate.

The porosity of the article affects the drying speed and the danger of explosive vaporization, in that pores permit water to evaporate or volatilize from the article. Prior art has increased porosity of the mixture by the addition of metal powders. JP 38154/1986 teaches a refractory mixture comprising aggregate, cement and aluminum powder. The aluminum powder reacts with added water to produce hydrogen gas. The bubbling gas forms pores through which drying can occur and steam can be released. The aluminum reaction produces copious amounts of heat that further aid in drying. Problems with aluminum powder include the strong exothermic quality of the reaction, release of inflammable hydrogen gas, formation of microcracks in the article, and limited shelf life of the aluminum powder. In order to control this reactivity, U.S. Pat. No. 5,783,510 and U.S. Pat. No. 6,117,373 teach a monolithic refractory composition comprising refractory aggregate, refractory powder, and reactive metal powder. The refractory powder includes aluminous cement to bond the aggregate, thereby imparting physical strength to an article formed by the composition. The reactive metal includes aluminum, magnesium, silicon and their alloys. The amount of reactive metal is selected to control generation of hydrogen gas and, thereby the porosity. Alternatively, Japanese Unexamined Patent Publication No, 190276/1984 teaches the use of fibers to form fine channels through which water can escape. Unfortunately, fibers are difficult to disperse uniformly in the mixture and decrease flowability. The porosity of the article is also increased with deleterious effects on physical properties of the finished article.

Refractory articles may include a chemical, that is, non-cementitious, binder that can eliminate the need for water. Viscosity is typically very high and aggregate/chemical binder mixtures often do not flow well. Chemical binders are typically activated by heating or firing at elevated temperatures, and are used, for example, in dry vibratable mixtures and many pre-formed articles. U.S. Pat. No. 6,846,763 includes granulated bitumen as a binder, along with refractory aggregate, an ignitable metal powder, and oil. Heating the mixture ignites the metal powder, which burns the oil, and melts and cokes the bitumen. The result is a carbon-bonded refractory article. A typical composition includes 70 wt. % aggregate, 6 wt. % silicon, 7 wt. % oil and 13 wt. % bitumen. Although requiring high temperature to form the carbon-bond, the article is substantially water-free. Carbon-bonded articles are not as stable as oxide-bonded articles. Unless held in a reducing atmosphere, carbon-bonded articles are also susceptible to oxidation at elevated temperature.

U.S. Pat. No. 5,366,944 teaches a refractory composition using both low temperature and high temperature binders. Water is not added to the composition. The low temperature binder includes organic binders such as phenolic resins. The high temperature binder includes a metal powder of aluminum, silicon, magnesium, their alloys and mixtures. An article can be formed from the composition and cured at low temperature to activate the low temperature binder. The low temperature binder holds the article together until the article is installed and the high temperature binder activates. The metal binder cannot activate until refractory temperatures are achieved. Advantageously, the metal binder produces an article of higher refractoriness than cement-based binders.

A need exists for a non-cement-based refractory mixture having low water content and low porosity, producing refractory articles with high strength at high temperatures.

SUMMARY OF THE INVENTION

The present invention relates to a mixture yielding refractory compositions that are useful, for example, as linings for various metallurgical vessels, such as furnaces, ladles, tundishes, and crucibles. The compositions may also be used for articles, in whole or part, that direct the flow of liquid metals. The mixture needs less water than traditional cement-based systems, thereby reducing drying times and the risk of explosion. The mixture does not require firing to achieve an initial cure. Advantageously, the mixture also increases refractoriness and strength of the resultant article when compared to cement-based mixtures.

In a broad aspect, the invention includes a cement-free mixture of a refractory aggregate and a substance producing a pH buffer. The mixture may contain a binder containing a finely powdered metal component. The application dictates the choice and gradation of raw materials, such as the chemical composition and particle size of the refractory aggregate and binder. An aggregate component with a large surface area, such as fumed silica, is believed to produce a gel that acts in the formation of a refractory material with low water content and low water porosity. References herein to fumed silica as an aggregate component are understood to pertain to dry fumed silica, as distinguished from colloidal silica. The presence of a substance producing a pH buffer, such as magnesia, alumina, zirconia or non-cementitious calcium compounds, or combinations of these materials, is also believed to act to form a refractory material with low water content and low water porosity.

The mixture of the invention requires less water than do traditional cement-based mixtures. Further, the addition of a given amount of water to the aggregate/binder mixture results in greater flowability than cement-based mixtures. Physical properties of the article are also less dependent on the amount of water added than cement-based articles.

In one embodiment, a mixture comprises a refractory aggregate and from 0.5 wt. % to 5 wt. % metal powder having a particle size of −200 mesh or finer. A sufficient amount of water is added to the mixture depending on the application. The pH of the mixture is adjusted so that evolution of hydrogen gas is prevented or reduced to an acceptable low level. Buffering agents, as known by one of ordinary skill in the art, can be used to maintain pH. Optionally, a deflocculant may be added to improve flow characteristics or reduce water requirements. The aggregate/binder/water blend may then be formed into any desired shape. The shape hardens to form an article. Heating, either in a kiln or at use temperature, produces an oxide-bonded article.

A preferred use of the binder is in a castable refractory formulation. The binder may also be used in other types of refractories, for example, plastic materials, ram materials, bricks, and pressed shapes. One skilled in the art would appreciate the need to adjust for pot life and forming sequences to achieve a set of the bond in a proper time interval.

In a specific embodiment, refractory aggregate comprising fireclay aggregate and fumed silica is combined with 1 wt. % aluminum powder, 0.5 wt. % magnesia buffer, and 0.2 wt. % deflocculant. Water is added at 5 wt. % and formed into the desired shape. Control of pH reduces hydrogen evolution and the resulting porosity. Firing produces a dense oxide-based article with reduced porosity. Fireclay is an alumina-silica material. Higher silica content corresponds to lower resistance to slag. Alumina-silica materials having less than a 60 wt % alumina content are rarely used in slag contact. For formulations used in slag contact, fireclay may be excluded from the formulation.

In another specific embodiment, the invention contains (a) a substance selected from brown fused alumina, bauxite, andalusite, tabular alumina, mullite and combinations of these materials, (b) silicon carbide, (c) fumed silica, (d) aluminum metal, (e) an anti-oxidant selected from boron carbide, silicon and combinations of these materials, (f) reactive alumina, and (g) a carbon-bearing material selected from carbon black, pitch, petroleum pitch/clay co-grind, graphite, and combinations of these materials. The formulation may contain less than 3.3 wt %, less than 0.2 wt %, or less than 0.1 wt % calcium containing compounds. Alternatively, the formulation can be described as containing less than 0.1 wt % water-soluble or partially water-soluble calcium compounds. Optionally, the formulation may contain deflocculant, a sequestering agent such as citric acid or boric acid, dispersants such as sodium hexametaphosphate and sodium lignosulfate, polypropylene fibers and deadburned MgO in, for example, a minus 200 mesh form; these substances are additives as the term is understood in the art. Such a formulation may contain at least 50 wt % and at most 80 wt % of a substance selected from brown fused alumina, bauxite, andalusite, tabular alumina, mullite and combinations of these materials. Such a formulation may contain at least 10 wt % and at most 35 wt %, at least 10 wt % and at most 25 wt %, or at least 15 wt % and at most 25 wt % silicon carbide. Such a formulation may contain at least 2 wt % and at most 8 wt %, or 4.5 wt % to 6 wt % fumed silica. Such a formulation may contain at least 0.1 wt % and at most 1.5 wt %, or at least 0.5 wt % and at most 1.0 wt % aluminum metal. Such a formulation may contain at least 0.25 wt % and at most 1.5 wt %, or at least 0.5 wt % and at most 1.0 wt % silicon metal. Such a formulation may contain at least 5 wt % and at most 15 wt %, or at least 5 wt % and at most 10 wt % reactive alumina. Such a formulation may contain at least 1 wt % and at most 6 wt %, or at least 2 wt % and at most 3 wt %, carbon.

DETAILED DESCRIPTION OF THE INVENTION

The mixture of the invention contains an aggregate and a substance yielding a pH buffer. The mixture of the invention yields a refractory composition without the use of cement. Cement-free mixtures according to the present invention contain less than the 3.3 wt % cement of the comparative example presented herein and may contain less than 0.2 wt % cement.

A binder may be used in the present invention in combination with ceramic aggregates, particularly refractory ceramic aggregates. The binder is cement-free and may consist essentially of metal powder. A mixture is framed comprising solid components including aggregate, metal powder binder and a pH buffer. A sufficient amount of water is added to the mixture. The mixture including the water is then formed into an article. The article may then be allowed to set and may be dried to remove excess water. The article may be heated to use temperature after drying. Unlike cement-based binders, the present binder has refractoriness similar to or greater than the aggregate. Physical properties of an article made using the metal binder can also exceed articles made using traditional binder systems.

The invention is not limited to any particular ceramic aggregate, that is, the ceramic aggregate may be of any suitable chemical compositions, or particle sizes, shapes or distributions. Common aggregates include silica, zirconia, silicon carbide, alumina, magnesia, spinels, and their combinations. Without intending to be bound by any particular theory, it is believed that silicon carbide in the formulation of the invention protects carbon in the formulation from oxidation by itself oxidizing to form silica that plugs pores so that oxygen cannot come in contact with the carbon. Silicon carbide is also believed to contribute to thermal shock resistance of components produced from the formulation of the invention. The aggregates may include fumed materials. In one embodiment of the invention, the aggregate contains fumed silica and a substance, such as alumina, magnesia, zirconia or non-cementitious calcium compounds, or combinations of these materials, yielding a pH buffer. The application in which the refractory article is to be used largely dictates the composition of the refractor aggregate. The bond is likewise suitable to produce castables for use in non-refractory applications. Suitable metals and aggregates can be employed to produce castables that can be used in ambient temperature structures. Typical applications are civil engineering structures (bridges, buildings, roads, etc), specialty concrete, and repair materials.

The binder may consist essentially of metal powder and contains no cement, such as calcium aluminate cement, which typically has lower strength and refractoriness than ceramic aggregate. The metal powder includes any metal capable of reacting with water to form a matrix between aggregate particles. The matrix may be, for example, a hydroxide gel. The metal powder should not be too reactive so that the rate of reaction with water is uncontrollable. Reactivity depends on at least the pH of the solution, the metal used, and the metal's size and shape. For example, alkali metals react violently with water regardless of pH. The metal powder must also not be too inert so that the set time is excessive or non-existent. Unreactive metals include the noble metals and other transition metals having a low chemical potential.

Suitable metals for the binder include, but are not limited to, aluminum, magnesium, silicon, iron, chromium, zirconium, their alloys and mixtures. The reactivity of these metals may be controlled by adjusting various factors, including pH and the particle size of the metal powder. A gel forms after mixing with water that binds the article until, at elevated temperature, an oxide bond forms that binds together the aggregate. The oxide bond is more refractory than calcium aluminate cement and many other bonding technologies.

The pH of the aggregate/binder/water mixture must be controlled so that the evolution of hydrogen gas is kept within acceptable limits. Hydrogen generation can be extremely and explosively exothermic. Additional deleterious effects of hydrogen evolution include increased porosity and premature decomposition of a hydroxide gel matrix. The pH needed to control hydrogen evolution will depend on the metal being used. This pH is calculable and is based on the chemical potential of the metal. An aggregate can be chosen that is capable of maintaining pH. Alternatively, a buffer may be necessary to maintain the desired pH. Suitable buffers are known to one skilled in the art and include magnesia, alumina, zirconia and non-cementitious calcium compounds, and combinations of these substances. Preferably, the buffer will be itself refractory or will decompose and volatize at use temperatures. A sequestering agent, such as citric acid or boric acid may be added to control set times. The invention may be practiced with a mixture having a pH no greater than 10.0.

The kinetics of the metal/water reaction is also controlled by the particle size of the metal powder. Reactivity of the metal powder is proportional to the available surface area. Greater surface area results in greater reactivity. An effective particle size of the metal powder is −70 mesh (212 microns) or smaller. Too large a particle size limits reactivity, and too small a particle size could make the kinetics of the reaction difficult to control. A convenient size is −200 mesh (75 microns) to −325 mesh (45 microns). Particle size is only one means of controlling surface area. The shape or texture of the metal powder could also be changed. Alternatively, the surface of the metal powder could be coated with a passivating agent, such as a polymer, wax or oxide.

The amount of metal binder varies with, among other things, the intended application, the refractory aggregate, the metal, and the expected speed of set. The binder will typically range from 0.5 wt. % to 5 wt. % of the mixture. As little as 0.1 wt. % has been effective and as much as 10 wt. % is contemplated. Lower amounts of binder can reduce the speed of set and the strength of the finished article. A sufficient amount of binder should be included in the mixture to achieve the desired properties. Higher amounts of binder increase costs and the risk of spontaneous reactions. For aluminum metal, a concentration of about 1 wt. % works satisfactorily for castable applications. If certain aggregate components, such as fumed silica, are used, the mixture of the invention can be produced without the use of metal binder. Specifically, mixtures according to the invention can be prepared without aluminum alloy powder.

Optionally, various additives may be included to improve physical properties during or after preparation of the article. A deflocculant may be added to improve flow and reduce water requirements. Carbon, for example, as graphite, carbon black or pitch, may be added to resist slag penetration during service. Petroleum pitch co-ground with clay may be used as a carbon source. Anti-oxidants, such as boron carbide or silicon, protect carbon from oxidation. Other additives are well known to one skilled in the art.

EXAMPLE 1

Two castable aggregate/binder mixtures were produced. Both mixtures were intended as refractory linings for blast furnace iron troughs and runners. A first mixture was a typical "ultra-low" cement castable comprising 74 wt. % alumina, 17.5 wt. % silicon carbide, 3.3 wt. % calcium aluminate cement, 2.5 wt. % fumed silica, and 0.2 wt. % metal powder. A second mixture was a cement-free composition of the present invention comprising 69 wt. % alumina, 22.5 wt. % silicon carbide, 6 wt. % fumed silica, 0.75 wt. % silicon and 0.5 wt. % aluminum.

Water was added to both mixtures. The cement-based mixture required from 4.25%-6.25 wt. % water to obtain an ASTM C-1445 flow from 20-100%. The cement-free mixture required only 2.75-3.75 wt % water to obtain 20-100% flow. The cement-free composition required about one-half as much water to achieve a desired flow.

The mixture and water were allowed to set. During setting, the cement in the first mixture increased the pH to over 10.0, thereby favoring a hydrolysis reaction between aluminum powder and water. The reaction produced hydrogen and heat. Hydrogen degassed from the mixture and produced pores and voids. The heat accelerated drying time. In contrast, the pH of the second mixture remained below 10.0 because, in part, of the absence of cement. Hydrolysis was thereby checked as was outgassing. Density of the cement-free mixture was higher than the cement-based mixture. Porosity of the dried ultra-low cement mixture varied from 16-24%. Porosity of the cement-free mixture was 13-15%.

The ultra-low cement and cement-free mixtures should be dried before use to remove any residual water. Advantageously, as described above, the amount of water needed in the cement-free article is significantly less than the cement-based mixture, so drying is facilitated. Once dried and brought to a use temperature of over 800 C, the cement-free material showed higher hot modulus of rupture (HMOR) than the ultra-low cement material. HMOR was performed according to ASTM C-583. HMOR of cement-free castable was 10.3, 20.7, 8.6 and 2.8 MPa at 800, 1100, 1370 and 1480 C, respectively. The ultra-low cement castable has lower HMOR at every temperature, that is, 6.2, 4.8, 5.5 and 2.1 MPa at 800, 1100, 1370 and 1480 C, respectively.

EXAMPLE 2

Table 1 lists the contents of a formulation according to the present invention:

TABLE 1

| Description | Particle Size | Weight % |
|---|---|---|
| Alumina, Brown Fused | −3/8" + 3 Mesh US | 14.935 |
| Alumina, Brown Fused | −3 + 6 Mesh US | 14.935 |
| Alumina, Brown Fused | −6 + 16 Mesh US | 16.595 |
| Alumina, Brown Fused | −16 + 50 Mesh US | 6.638 |
| Alumina, Brown Fused | −50 Mesh US | 11.053 |
| Silicon Carbide | −100 Mesh | 4.978 |
| Silicon Carbide | −200 Mesh | 12.446 |
| Silica, Fume, Simcala | | 2.323 |
| Silica, Fume, TAM | | 2.323 |
| Al Metal/V-120 Valimet | −325 Mesh US | 0.498 |
| Silicon Metal, RG98 | −200 Mesh US | 0.730 |
| Alumina, Reactive, A3000FL | $d_{50} = 2.7\mu$ | 6.638 |
| Alumina, Reactive, A152SG | $d_{50} = 1.3\mu$ | 2.489 |
| Carbon Black N991 | | 1.991 |
| Petroleum Pitch/Clay* | −100 Mesh US | 0.996 |
| MagChem 98, Pulverized | −200 Mesh US | 0.030 |
| Vitrafos (Sodium Hexametaphosphate) | | 0.123 |
| Ultrazine NA | | 0.050 |
| Fibers, Polypropylene, T-153, 1/4" | | 0.199 |
| Optibor TG (Boric Acid) | | 0.030 |
| | | 100.000 |

*Pitch is co-ground at 80% with 20% clay to reduce the tendency of the pitch to fuse together during shipment and storage.

In the Example 2 formulation, the brown fused alumina is included in various particle sizes to obtain good particle packing. Other aggregates such as bauxite, mullite (Mulcoa 60), andalusite, and tabular alumina can be used in variations on this formulation. Silicon carbide improves slag resistance; this formulation can serve as a slag resistant castable for blast furnace troughs and runners. Carbon is not wetted by blast furnace slag, so carbon-containing substances such as carbon black and petroleum pitch are added to reduce slag penetration into the pore structure of the castable. Ultrazine NA is a sodium lignosulfonate additive that acts to disperse the carbon black and pitch. The polypropylene fibers are included to aid in drying the material after forming. The fibers shrink and melt, leaving fine channels through which steam can escape. The two reactive aluminas have very fine particle sizes to assist in the overall particle packing—the wider the range of sizes from coarsest to finest the denser the packing and the lower the porosity. The Vitrafos (sodium hexametaphosphate, or SHMP) is used as a deflocculant to disperse the particles of the castable and minimize the water required. Another deflocculant that has been found to be effective is modified polycarboxylate ether Castament FS20 (BASF).

In calcium aluminate cement formulations, fume silica enhances flow and enhances cast density. The particles of fume silica are very fine and spherical, enabling other constituents to flow better when mixed with water. The very fine particle size of fume silica enhances particle packing to produce high density and low porosity. In the invention the fume silica has a second function. It gives the castable its initial green strength as it sets. Without intending to be bound by any particular theory, it is believed that this is due to hydroxyl groups that form on the silica particles, by reaction with water. The hydroxyl groups are believed to promote hydrogen bonding between the silica and other particles to form a three-dimensional network. It is believed that a condensation reaction then takes place forming a Si—O—Si network, either by a shift in pH or increased concentration (by removal of water), or both. This appears to be a crude sol-gel process. The MagChem 98 is a dead burned MgO that increases the setting rate, while boric acid slows down the rate. The level of these additives in the formula has been found to give good working time. MgO ranges that have been found to be effective are from 0.03 to 0.25 wt %, or from 0.03 to 0.12 wt %. Increased MgO content is found to decrease working time. Boric acid effective ranges include 0 to 0.06 wt % and 0.01 wt % to 0.06 wt %. Increased boric acid content is found to slow the working time down. The formulation shown in Table I contains two fume silicas. The Simcala is higher in impurities (particularly carbon) while the TAM has lower impurities. The combination happens to lower the water requirement compared to Simcala alone. However, either of these fume silicas (or others) could be used alone in an alternate formulation. Alternative formulations may have aluminum and silicon content other than as shown in this Example. From 0.1 wt % to 5 wt %, or from 0.3 wt % to 5 wt %, of either Al or Si or a combination may be beneficial in a formulation of the invention.

Fume silica (or silica fume) is a byproduct of producing silicon metal or ferrosilicon alloys. Silica fume consists primarily of amorphous (non-crystalline) silicon dioxide ($SiO_2$). The individual particles are extremely small, less than 1μ. Because of its fine particles, large surface area, and the high $SiO_2$ content, silica fume is a very reactive pozzolan when used in construction concrete as well as refractory concrete.

A wide range of fume silicas can be used in the present invention. It has been observed that acidic fume silicas increase the setting time of the formulation of the present invention. A fume silica with a typical pH of 2.5 to 3.5 produced a formulation with a setting time of 48 hours; fume silicas with a pH in the range of 5 to 8 produced formulations with a setting time of 24 hours or fewer. The present invention can therefore be practiced with fume silica or fume silica mixtures with a pH greater than 3.5, greater than 4, greater than 4.5, or greater than 5.

Colloidal silicas are not the same as fume silicas. Colloidal silicas are suspensions of fine amorphous, nonporous, and typically spherical silica particles in a liquid phase. Usually they are suspended in an aqueous phase that is stabilized electrostatically. Colloidal silicas exhibit particle densities in the range of 2.1 to 2.3 g/cm$^3$.

Most colloidal silicas are prepared as monodisperse suspensions with particle sizes ranging from approximately 30 to 100 nm in diameter. Polydisperse suspensions can also be synthesized and have roughly the same limits in particle size.

Smaller particles are difficult to stabilize while particles much greater than 150 nanometers are subject to sedimentation.

Colloidal silicas are most often prepared in a multi-step process where an alkali-silicate solution is partially neutralized, leading to the formation of silica nuclei. The subunits of colloidal silica particles are typically in the range of 1 to 5 nm. Whether or not these subunits are joined together depends on the conditions of polymerization. Initial acidification of a water-glass (sodium silicate) solution yields $Si(OH)_4$.

If the pH is reduced below 7 or if salt is added, then the units tend to fuse together in chains. These products are often called silica gels. If the pH is kept slightly on the alkaline side of neutral, then the subunits stay separated, and they gradually grow. These products are often called precipitated silica or silica sols. Hydrogen ions from the surface of colloidal silica tend to dissociate in aqueous solution, yielding a high negative charge on the surface of the colloidal silica. Substitution of some of the Si atoms by Al is known to increase the negative colloidal charge, especially when it is evaluated at pH below the neutral point. Because of the very small size, the surface area of colloidal silica is very high.

The colloidal suspension is stabilized by pH adjustment and then concentrated, usually by evaporation. The maximum concentration obtainable depends on the on particle size. For example, 50 nm particles can be concentrated to greater than 50 wt % solids while 10 nm particles can only be concentrated to approximately 30 wt % solids before the suspension becomes too unstable.

Aluminum and silicon metal powders are very reactive, especially at temperatures above their melting points. Pure silicon melts at 2577° F. (1414° C.) and aluminum at 1221° F. (660° C.). In carbon bonded refractories such as magnesia-graphite and alumina-graphite, aluminum and silicon metals are beneficial. In the absence of the metals, when carbon in the refractory begins to oxidize carbon monoxide (CO) is formed and leaves the refractory as a gaseous phase, leaving behind a weak decarburized zone that is vulnerable to slag attack. In the presence of the metals, the CO reacts with them to form aluminum and silicon carbides, retaining the carbon in the refractory. The carbides strengthen the refractories at high temperatures and densify their pore structure.

The magnesia-graphite and alumina-graphite refractories with the metal powders are mixed with non-aqueous resin binders, pressed and cured with heat to form a refractory shape. In U.S. Pat. No. 5,250,479, Rancoule and DeBastiani describe such a magnesia-carbon refractory for slide gates.

Although carbon containing castables would also benefit from metal powder additions, the metals hydrolyze to form hydrogen gas in water when the pH is alkaline (passivating oxide layers on metal particles become soluble), as is the case with conventional calcium aluminate cement binders. The reactions are as follows:

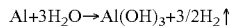

$Al + 3H_2O \rightarrow Al(OH)_3 + 3/2 H_2 \uparrow$

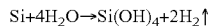

$Si + 4H_2O \rightarrow Si(OH)_4 + 2H_2 \uparrow$

The reactions are exothermic along with the gas evolution, so the combination of heat and gas pressure can open up voids and crack the castable. The hydrolysis also destroys the powders in their metallic form so the beneficial high temperature reactions no longer take place.

In conventional cement bonded alumina-SiC—C castables a small amount of aluminum metal powder (0.1 to 0.3%) is often added to deliberately generate hydrogen gas to open fine channels through the castable to allow easier release of steam during dry-out. In other words, the metal functions in much the same way as the polypropylene fibers to prevent steam spalling during dry-out. In a gas evolution test, a graduated cylinder was full of water and inverted in a larger container of water. A flask was filled with 400 grams of wet castable according to the Example 2 formulation and stoppered, with a tube running from its top to the water-filled graduate so any gas evolved would bubble into the graduate, displacing the water. By this method the Example 2 formulation with 0.5 wt % Al, as well as a variant with 1% Al, evolved no gas in 24 hours. The conventional mix with 0.1% Al evolved 430 ml of gas, which calculates to about 80% of the metal reacting. The compositions of the present invention are therefore shown to take advantage of the high temperature benefits of the reactive metal powders without having the disadvantages of gas evolution of prior art formulations.

EXAMPLE 3

As described above, the bond system of the invention allows metal powders to be incorporated without them being hydrolyzed during setting as occurs in cement bonded castables. The colloidal silica binder also allows the addition of metal powders without hydrolysis, so other factors must be taken into consideration to determine which system has superior properties for a particular application.

Table II shows examples of mixes based on the invention, with and without metals (Mix 1 and 2), similar colloidal silica bonded castables (Mix 3 and 4) and conventional cement bonded castable (Mix 5). The colloidal silica bonded mixes still contain fume silica as noted in US522323 to Banerjee, et al. and US20080314084 to Connors, et al. The extremely fine particles of fume silica serve to improve packing density and flowability of the mix as a whole as discussed earlier. However, the main binding agent in Mix 3 and Mix 4 is an addition of colloidal silica as an aqueous suspension. This also imparts flow to the mix as water does in the invention and cement-bonded castables.

Table III shows several properties of the mixes. The hot MOR at 2700° F. is indicative of how strong the materials would be at iron making temperatures. Mix 1 with the cement-flee bond of the invention and metal powders is the strongest, followed by Mix 2 (same bond with no metals). The colloidal silica bonded materials are far inferior in hot strength, with or without metals. Without intending to be bound by any particular theory, it is believed that this is due to the high amount of water (60%) in the colloidal silica suspension and the resulting high volume of open pores reducing mechanical properties. The cement bonded castable is poor in hot MOR because of the low melting CaO—$Al_2O_3$—$SiO_2$ compounds that form by reaction of the matrix components and calcium aluminate cement. Resistance to corrosion of blast furnace trough castables is related to maintaining carbon in the pores to minimize slag penetration. In the carbon retention test, bars are fired in air at temperatures typical of the cooler pails of a trough lining where oxidation is prevalent. After the test the bars are cut in half and the dark core area (carbon retained) and the overall area are measured. The carbon retention is expressed as a percent of the total cross-sectional area of the bar. Mix 1 is the only one that maintains any carbon when fired at 2000° F. The colloidal silica bonded mixes (3 and 4) are the worst in carbon retention, again due to the open pore structure.

TABLE II

Composition of formulations of the invention, colloidal silica bonded castables, and cement bonded castables

| | 1 % | 2 % | 3 % | 4 % | 5 % |
|---|---|---|---|---|---|
| Brown Fused Alumina (3/8" and Finer) | 60.0 | 61.25 | 60.105 | 61.335 | 64.3 |
| Silicon Carbide (100 mesh and finer) | 22.5 | 22.5 | 22.5 | 22.5 | 17.4 |
| Fume Silica | 6.0 | 6.0 | 6.0 | 6.0 | 2.5 |
| Al Metal −325 mesh | 0.5 | | 0.5 | | 0.1 |
| Si Metal −200 mesh | 0.75 | | 0.75 | | 0.1 |
| Boron Carbide −325 mesh | | | | | 0.1 |
| Reactive and calcined aluminas −325 mesh | 9.195 | 9.195 | 9.195 | 9.195 | 10.0 |
| Calcium aluminate Cement, 71% Alumina | | | | | 3.3 |
| Carbon Black and pitch powders | 0.75 | 0.75 | 0.75 | 0.75 | 2.0 |
| Dead burned MgO, −200 mesh | 0.03 | 0.03 | 0.2 | 0.2 | |
| Sodium Hexametaphosphate | 0.12 | 0.12 | | | 0.1 |
| Ultrazine NA | 0.025 | 0.025 | | | 0.05 |
| Boric Acid | 0.03 | 0.03 | | | |
| Polypropylene Fibers | 0.10 | 0.10 | | | 0.05 |
| TOTAL DRY | 100.0 | 100.0 | 100.0 | 100.0 | 100.0 |
| Water Added, % | 3.75 | 3.75 | | | 5.00 |
| Colloidal Silica (40% solids) added, % | | | 8.0 | 8.0 | |

TABLE III

Properties of formulations of the invention, colloidal silica bonded castables, and cement bonded castables

| | 1 | 2 | 3 | 4 | 5 |
|---|---|---|---|---|---|
| 15 Tap Flow, % (ASTM C1445) | 60 | 67 | 63 | 73 | 52 |
| Hot MOR, psi (ASTM C583) | | | | | |
| At 2700° F. | 742 | 500 | 366 | 242 | 122 |
| Carbon Retention, % Fired 5 hours in Air | | | | | |
| At 1500° F. | 42 | 37 | 19 | 12 | 32 |
| At 2000° F. | 15 | 0 | 0 | 0 | 0 |

Although the present invention has been described in relation to particular embodiments thereof, many other variations and modifications and other uses will become apparent to those skilled in the art. The present invention is not to be limited by the specific disclosure herein.

What is claimed:

1. A refractory mixture for the production of a refractory article, comprising
    a) a substance selected from brown fused alumina, bauxite, andalusite, tabular alumina, mullite and combinations of these materials;
    b) silicon carbide;
    c) fumed silica;
    d) aluminum metal;
    e) an anti-oxidant selected from boron carbide, silicon and combinations of these materials;
    f) reactive alumina; and
    g) a carbon-bearing material selected from carbon black, pitch, petroleum pitch/clay co-grind, graphite, and combinations of these materials.

2. The refractory mixture of claim 1, comprising
    a) at least 50 wt % and at most 80 wt % of a substance selected from brown fused alumina, bauxite, andalusite, tabular alumina, mullite and combinations of these materials;
    b) at least 10 wt % and at most 25 wt % silicon carbide;
    c) at least 2 wt % and at most 8 wt % fumed silica;
    d) at least 0.1 wt % and at most 1.5 wt % aluminum metal;
    e) at least 0.25 wt % and at most 1.5 wt % silicon;
    f) at least 5 wt % and at most 15 wt % reactive alumina; and
    g) at least 1 wt % and at most 6 wt % of a carbon-bearing material selected from carbon black, pitch, petroleum pitch/clay co-grind, graphite, and combinations of these materials.

3. The refractory mixture of claim 1, wherein an amount of calcium-containing compounds is less than 3.3 wt %.

4. The refractory mixture of claim 1, further comprising a material selected from the group consisting of zirconia and magnesia.

5. The refractory mixture of claim 1, wherein the fumed silica has a particle size of no greater than 70 mesh.

6. The refractory mixture of claim 1, further comprising a deflocculant.

7. The refractory mixture of claim 1, wherein the combined amount of aluminum and silicon present is in the range from and including 0.1 wt % to and including 5 wt %.

8. The refractory mixture of claim 1, wherein the combined amount of aluminum and silicon present is in the range from and including 0.3 wt % to and including 5 wt %.

9. The refractory mixture of claim 1, wherein the amount of silicon carbide present is in the range from and including 15 wt % to and including 25 wt %.

10. The refractory mixture of claim 1, wherein the amount of fume silica present is in the range from and including 4.5 wt % to and including 6 wt %.

11. The refractory mixture of claim 1, wherein the amount of aluminum metal present is in the range from and including 0.5 wt % to and including 1 wt %.

12. The refractory mixture of claim 1, wherein the amount of silicon metal present is in the range from and including 0.5 wt % to and including 1 wt %.

13. The refractory mixture of claim 1, wherein the amount of reactive aluminas present is in the range from and including 5 wt % to and including 10 wt %.

14. The refractory mixture of claim 1, wherein an amount of calcium-containing compounds is equal to or less than 0.2 wt %.

15. The refractory mixture of claim 1, wherein a content of water-soluble calcium compounds and partially water-soluble calcium compounds is less than 0.1 wt %.

16. The refractory mixture of claim 1, consisting essentially of:
    a) a substance selected from brown fused alumina, bauxite, andalusite, tabular alumina, mullite and combinations of these materials;
    b) silicon carbide;
    c) fumed silica;
    d) aluminum metal;
    e) an anti-oxidant selected from boron carbide, silicon and combinations of these materials;
    f) reactive alumina;
    g) a carbon-bearing material selected from carbon black, pitch, petroleum pitch/clay co-grind, graphite, and combinations of these materials; and
    h) additives.

17. A refractory article formed from the mixture of claim 1, made from a process characterized by:
    a) mixing solid components;

b) adding a sufficient amount of water to create a mixture with a desired flowability and a pH;
c) forming the mixture into an article;
d) allowing the article to set; and
e) drying the set article to remove excess water.

18. The refractory article of claim 17, characterized by heating the article to use temperature after drying.

19. A method of manufacturing an article from the refractory mixture of claim 1, characterized by:
a) mixing solid components;
b) adding a sufficient amount of water to create a mixture with desired flowability;
c) forming the mixture into an article;
d) allowing the article to set; and
e) drying the set article to remove excess water.

* * * * *